United States Patent
Hamburg et al.

(10) Patent No.: US 12,335,365 B2
(45) Date of Patent: Jun. 17, 2025

(54) PROTECTION OF TRANSFORMATIONS BY INTERMEDIATE RANDOMIZATION IN CRYPTOGRAPHIC OPERATIONS

(71) Applicant: CRYPTOGRAPHY RESEARCH, INC., San Jose, CA (US)

(72) Inventors: Michael Alexander Hamburg, 's-Hertogenbosch (NL); Helena Handschuh, Palo Alto, CA (US); Mark Evan Marson, Carlsbad, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 383 days.

(21) Appl. No.: 18/008,602

(22) PCT Filed: Jun. 4, 2021

(86) PCT No.: PCT/US2021/036005
§ 371 (c)(1),
(2) Date: Dec. 6, 2022

(87) PCT Pub. No.: WO2021/252294
PCT Pub. Date: Dec. 16, 2021

(65) Prior Publication Data
US 2023/0254115 A1    Aug. 10, 2023

Related U.S. Application Data

(60) Provisional application No. 62/705,027, filed on Jun. 8, 2020.

(51) Int. Cl.
*H04L 9/06* (2006.01)
*G06F 17/14* (2006.01)

(52) U.S. Cl.
CPC .......... *H04L 9/0631* (2013.01); *G06F 17/142* (2013.01)

(58) Field of Classification Search
CPC ..... H04L 9/0631; H04L 9/003; G06F 17/142; G06F 2207/7223; G06F 7/5443
See application file for complete search history.

(56) References Cited

U.S. PATENT DOCUMENTS

| 9,942,039 B1 | 4/2018 | Gutoski et al. |
| 2009/0097637 A1 | 4/2009 | Boscher et al. |
| 2019/0044720 A1 | 2/2019 | Poeppelmann |

OTHER PUBLICATIONS

Longa, Patrick et al., "Speeding Up The No. Theoretic Transform for Faster Ideal Lattice-Based Cryptography", IACR Cryptology ePrint Archive, 2016, 504 18 pages.
(Continued)

*Primary Examiner* — Mohammed Waliullah
(74) *Attorney, Agent, or Firm* — Lowenstein Sandler LLP (57) ABSTRACT

Aspects of the present disclosure involve a method and a system to perform a cryptographic operation that involves a number theoretic transformation of a first vector to a second vector by obtaining components of the first vector, performing a plurality of iterations that each include determining a plurality of output values, wherein each of the plurality of output values is a linear combination of two or more input values, the input values into a first iteration being the components of the first vector and the output values of the last iteration being representative of components of the second vector, and wherein one or more of the output values of at least one iteration are randomized by multiplying at least one input value by a random number, and determining, based on the output values of the last of the plurality of iterations, the components of the second vector.

20 Claims, 5 Drawing Sheets

(56) References Cited

OTHER PUBLICATIONS

Notification of Transmittal of the International Search Report and the Written Opinion of the International Searching Authority, or the Declaration with Mail Date Sep. 8, 2021 re: Int'l Appln. No. PCT/US2021/036005. 13 pages.
Ravi, Prasanna et al., "Generic Side-Channel Attacks on CCA-Secure Lattice-Based PKE and KEM Schemes", IACR Cryptology ePrint Archive 2019 (2019): 948. 28 pages.
EP Extended European Search Report with Mail Date Jun. 21, 2024 re: EP Appln. No. 21821387.4. 10 pages.
Nejatollahi, Hamid et al., "Domain-Specific Accelerators for Ideal Lattice-Based Public Key Protocols", IACR, International Association for Cryptologic Research, vol. 20180622:144358, Jun. 19, 2018, xp061025931, URL:http://eprint.iacr.org/2018.608.pdf. 16 pages.
Saarinen, Markku-Juhani O., "Arithmetic Coding and Blinding Countermeasures for Lattice Signatures", IACR, International Association for Cryptologic Research, vol. 20170123:050054, Dec. 20, 2016, XP061022310. 18 pages.

PROTECTION OF TRANSFORMATIONS BY INTERMEDIATE RANDOMIZATION IN CRYPTOGRAPHIC OPERATIONS

TECHNICAL FIELD

The disclosure pertains to cryptographic computing applications, more specifically to protection of cryptographic operations, such as computations of transformations containing secret information, from side-channel attacks.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to protection of cryptographic operations employing linear transformations, by using randomizations of the data and/or data flow, for safeguarding data against side-channel attacks.

In public-key cryptography systems, a processing device may have various components/modules used for cryptographic operations on input messages. Input messages used in such operations are often large positive integers. Examples of cryptographic operations include, but are not limited to operations involving Rivest-Shamir-Adelman (RSA) and Elliptic Curve Diffie-Hellman (ECDH) keys, digital signature algorithms (DSA), Elliptic Curve Digital Signature Algorithms (ECDSA) used to authenticate messages transmitted between nodes of the public-key cryptography system. Cryptographic algorithms often involve modular arithmetic operations with modulus p, in which the set of all integers Z is wrapped around a circle of length p (the set $Z_p$), so that any two numbers that differ by p (or any other integer multiple of p) are treated as the same number. Pre-quantum cryptographic applications often exploit the fact that extracting a private key multiplier from a public key product (modulo p) that involves the private key multiplier may be a prohibitively difficult operation on a classical computer. Progress in development of quantum computers has placed some of the conventional algorithms (RSA, DSA, ECDH, EDCDSA) into jeopardy and motivated development of a number of post-quantum cryptographic algorithms, such as hash-based algorithms, code-based algorithms, multivariate algorithms, lattice-based algorithms, secret-key algorithms, symmetric key algorithms, and other algorithms. Some of the post-quantum algorithms are based on the shortest vector problem, namely on the difficulty of determining the shortest (non-zero) vector in a vector space with a known basis. For example, Kyber and NewHope key-encapsulation algorithms are based on the hardness of solving the Learning with Error problem over modular lattices.

Cryptographic applications employ a variety of schemes and algorithms to protect data using secret keys. Using secret keys and other secret information in computational operations may expose the secret information to side-channel attacks. A side-channel attack may be performed by monitoring emanations (signals) produced by electronic circuits of the target's (victim's) computer. Such signals may be acoustic, electric, magnetic, optical, thermal, and so on. By recording emanations, a hardware trojan and/or malicious software may be capable of correlating specific processor (and/or memory) activity with operations carried out by the processor. A simple power analysis (SPA) side-channel attack may involve examination of the electric power used by the device as a function of time. As the presence of noise masks the signal of the processor, a more sophisticated differential power analysis (DPA) attack may involve undertaking statistical analysis of power measurements performed over multiple cryptographic operations (or multiple iterations of a single cryptographic operation). An attacker employing DPA may be capable of filtering out the noise component of the power signal (using the fact that the noise components may be uncorrelated between different operations or iterations) to extract the component of the signal that is representative of the actual processor operations, and to infer the value of the private key from this signal.

A number of post-quantum cryptographic schemes for key encapsulation algorithms (e.g., Kyber, NewHope) and digital signatures (e.g., Dilithium) have been developed as part of an initiative by the National Institute of Standards and Technology. Such cryptographic applications utilize efficient multiplication in polynomial rings and use number-theoretic transforms (NTT). An NTT is an analog of a discrete Fourier transform (DFT) which, being applied to an N-component input vector x(m), m=0, 1, 2, .... N−1, transforms the input vector into an output vector X(k), k=0, 1, 2, .... N−1, using a polynomial in a number $W_N$ that is an Nth root of unity, $W_N^N=1$:

$$X(k) = \sum_{m=0}^{N-1} x(m) W_N^{mk}.$$

In cases of DFT, the number $W_N$ may be a complex number on the complex ring of radius one, e.g., $W_N=\exp(-2\pi i/N)$. In cases of NTT, the number $W_N$ may be a natural number within the ring $Z_p$ whose Nth power is 1 modulo p: $W_N^N=1$ (mod p). For example, if the transformation is applied to 8-component vectors (N=8) and it is selected that p=17, then the Nth root of unity may be chosen as $W_N=2$ so that $W_N^N=1$ mod p. Indeed, $W_N^N=2^8=256$, which on the ring $Z_{17}$ is equal to unity (256−17×15=1).

In secure cryptographic applications, the number of components N is often large. Direct calculation of the NTT according to the definition above leads to $N^2$ multiplications ($4N^2$ real multiplications, in case of DFT). Techniques of a fast Fourier transformation (FFT) reduce the number of required operations to N log N and are based on efficient use of certain symmetry properties of the roots of unity, such as $W_N^{N/2}=-1$, $W_N^{2l}=W_{N/2}^l$, and the like. The FFT techniques are also applicable to NTTs and are referred herein in this context as Fast NTT. A Fast NTT (similar to the FFT) amounts to first computing N/2 2-point transforms (a first iteration), followed by computing N/4 4-point transforms (a second iteration), and so on, until the last iteration where the ultimate N-point transform is obtained ($\log_2$ N-th iteration), as explained in more details in reference to FIGS. 2 and 3 below. Fast NTT, as well as FFT, may be performed using Cooley-Tukey butterfly operations, where two input values into a particular iteration, A and B, may be transformed into the output values according to: A, B→A+B·$W_N$, A−B·$W_N$. In an alternative implementation using Gentleman-Sande butterfly operations, the input values may be transformed into the output values according to: A, B→A+B, (A−B)·$W_N$. In some implementations, at least some of the Fast NTT iterations may involve roots of unity of the double (2N) order $W_{2N}$, for enhanced cryptographic protection.

Secret information contained in the input vector x(m) and the output vector X(k) can be vulnerable to side-channel attacks in which an attacker can use a single-trace emission operation by measuring emissions (emanations) from a processor (and/or a memory device) performing the transformation. Various countermeasures can be developed to randomize the computational operations and lessen deterministic emanations from the processor/memory devices. For example, the linear nature of the NTT may be used to blind the transformations (throughout this disclosure, whenever an NTT is referenced it shall be understood that similar techniques apply also to DFTs). The blinding process may use a random vector y(m) to blind the input x(m). For example, a first transformation may be applied to the sum of the input vectors x(m)+y(m) and a second transformation may be applied to the random input vector y(m). Subsequently, the output vector of the second transformation Y(k) may be subtracted from the output vector of the first transformation X(k)+Y(k) to determine the target transformation X(k). Because correlations between the inputs into the first transformation and the second transformation may nonetheless be traced by a side-channel attacker, such blinding may provide additional but still sub-optimal protection. Similar reblinding may be performed separately for each iteration of the Fast NTT algorithm (e.g., with different random vectors y generated for various iterations), but this may result in significant costs in terms of memory and processor operations. Other protective measures may include performing NTT computations in a randomized order, but such randomization may be difficult to implement.

Aspects of the present disclosure address this and other shortcomings of the conventional NTT implementations, by describing intermediate randomizations performed during various iterations of the Fast NTT procedure. Consecutive Fast NTT iterations may include performing one or more multiplication operations that involve multiplying output values of a previous iteration by the root of unity, A·$W_N$. In one implementation, such operations may be protected by an additional multiplication by a random number α: A·$W_N$→A·$W_N$·α. In another implementation, such operation may be protected by replacing the root of unity with another randomly-selected root of unity of the same order $W_N$→$\tilde{W}_N$ or a randomly-selected root of unity of the double (2N) order $W_N$→$\tilde{W}_{2N}$. Such randomization may be performed in some or all of the Fast NTT iterations. At the end (or at the beginning) of the Fast NTT, the output values of the last iteration (or the input values into the first iteration) may be adjusted to compensate for the randomization factors incurred during the Fast NTT iterations. As a result, the correct (target) output vector may still be computed while decreasing deterministic emanations from the system hardware and masking the computations from a potential side channel attack. Introducing randomization increases entropy of the computations and makes it more difficult for an attacker to collect a set of statistical data sufficient to discover secret information. The disclosed implementations may be used with NTTs as well as with DFTs (real or complex).

Figure 1:
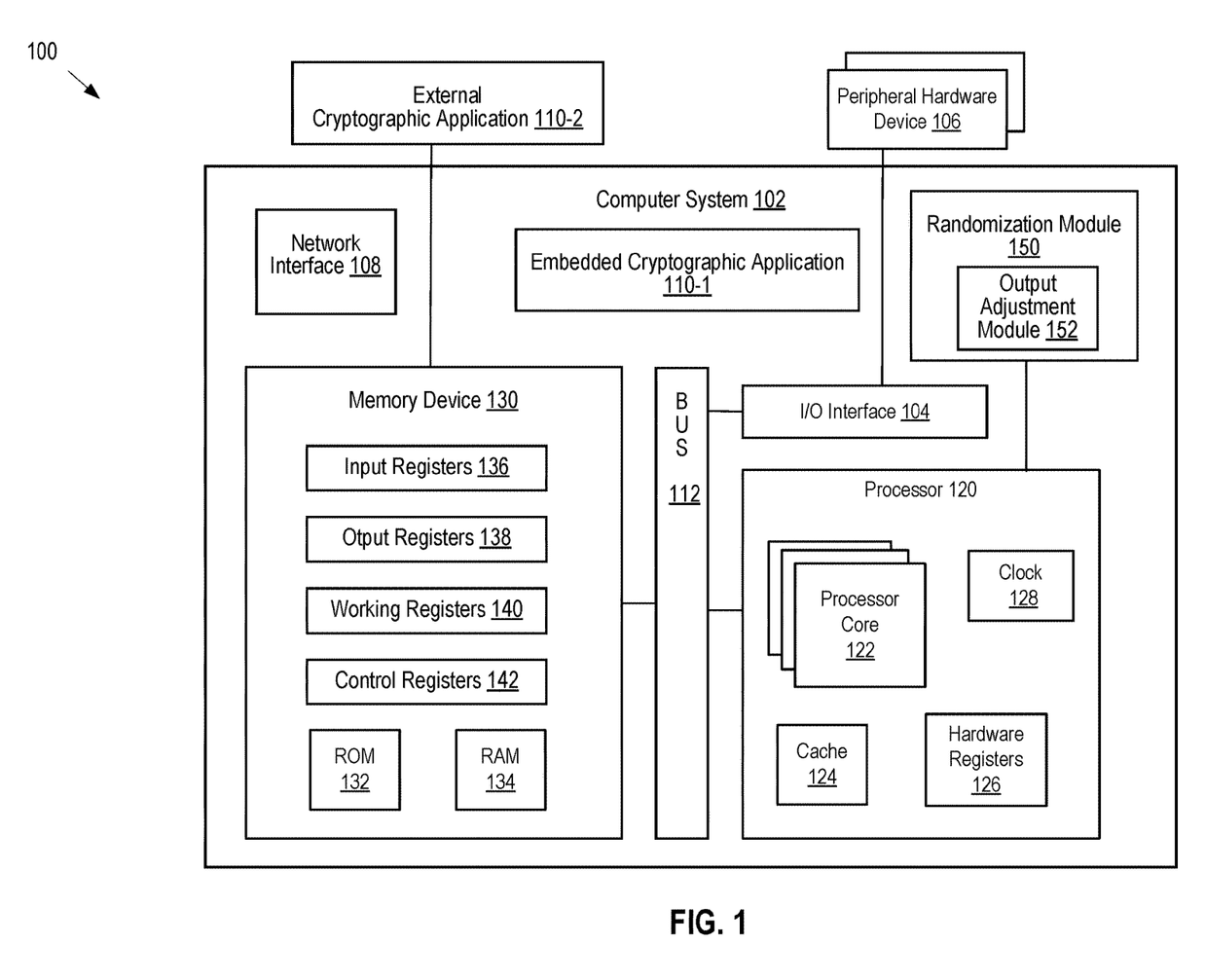
FIG. 1 is a block diagram illustrating an example system architecture capable of protecting transformations performed therein as part of a cryptographic operation using intermediate randomization, in accordance with one or more aspects of the present disclosure.

FIG. 1 is a block diagram illustrating an example system architecture 100 capable of protecting transformations performed therein as part of a cryptographic operation using intermediate randomization, in accordance with one or more aspects of the present disclosure. The example system architecture 100 may be a desktop computer, a tablet, a smartphone, a server (local or remote), a thin/lean client, and the like. The example system architecture 100 may be a smart card reader, a wireless sensor node, an embedded system dedicated to one or more specific applications (e.g., cryptographic applications 110), and so on. The system architecture 100 may include, but not be limited to, a computer system 102 having one or more processors 120 (e.g., central processing units (CPUs)) capable of executing binary instructions, and one or more memory devices 130. "Processor" refers to a device capable of executing instructions encoding arithmetic, logical, or I/O operations. In one illustrative example, a processor may follow Von Neumann architectural model and may include an arithmetic logic unit (ALU), a control unit, and a plurality of registers. "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module.

The system architecture 100 may include an input/output (I/O) interface 104 to facilitate connection of the computer system 102 to peripheral hardware devices 106 such as card readers, terminals, printers, scanners, internet-of-things devices, and the like. The system architecture 100 may further include an internet interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer system 102. Various hardware components of the computer system 102 may be connected via a bus 112 which may have its own logic circuits, e.g., a bus interface logic unit.

The computer system 102 may support one or more cryptographic applications 110, such as an embedded cryptographic application 110-1 and/or external cryptographic application 110-2. The cryptographic applications 110 may be secure authentication applications, public key signature applications, key encapsulation applications, key decapsulation applications, encrypting applications, decrypting applications, secure storage applications, and so on. The external cryptographic application 110-2 may be instantiated on the same computer system 102, e.g., by an operating system executed by the processor 120 and residing in the memory device 130. Alternatively, the external cryptographic application 110-2 may be instantiated by a guest operating system supported by a virtual machine monitor (hypervisor) executed by the processor 120. In some implementations, the external cryptographic application 110-2 may reside on a remote access client device or a remote server (not shown), with the computer system 102 providing cryptographic support for the client device and/or the remote server.

The processor 120 may include one or more processor cores 122 having access to cache 124 (single or multi-level cache) and one or more hardware registers 126. In implementations, each processor core 122 may execute instructions to run a number of hardware threads, also known as logical processors. Various logical processors (or processor cores) may be assigned to one or more cryptographic applications 110, although more than one processor may be assigned to a single cryptographic application for parallel processing. A multi-core processor 120 may simultaneously execute multiple instructions. A single core processor 120 may typically execute one instruction at a time (or process a single pipeline of instructions). A processor 120 may be implemented as a single integrated circuit, two or more integrated circuits, or may be a component of a multi-chip module.

The memory device 130 may refer to a volatile or non-volatile memory and may include a read-only memory (ROM) 132, a random-access memory (RAM) 134, as well as (not shown) electrically erasable programmable read-only memory (EEPROM), flash memory, flip-flop memory, or any other device capable of storing data. The RAM 134 may be a dynamic random access memory (DRAM), synchronous DRAM (SDRAM), a static memory, such as static random access memory (SRAM), and the like.

The memory device 130 may include one or more registers, such as one or more input registers 136 to store the input vector x(m), one or more output registers 138 to store the output vector X(k), and one or more working registers 140 to store intermediate values generated during various Fast NTT iterations. The memory device 130 may further include one or more control registers 142 for storing information about modes of operation, selecting a key encapsulation/digital signature algorithm (e.g., Kyber, NewHope, Dilithium, and the like), initializing operations of the NTT procedure, selecting an implementation of the initialized NTT procedure (such as Cooley-Tukey butterflies or Gentleman-Sander butterflies). The control registers 142 may communicate with one or more processor cores 122 and a clock 128, which may keep track of an iteration being performed. The registers 136-142 may be implemented as part of the RAM 134. In some implementations, some or all of the registers 136-142 may be implemented separately from the RAM 134. Some or all of the registers 136-142 may be implemented as part of the processor 120 (e.g., as part of the hardware registers 126). In some implementations, the processor 120 and the memory device 130 may be implemented as a single field-programmable gate array (FPGA).

The computer system 102 may include a randomization module 150 to provide instructions to the processor 120 to perform DPA-resistant cryptographic operations, in accordance with implementations of the present disclosure. The randomization module 150 may be implemented in software, in hardware (e.g., as part of the processor 120), in firmware, or in any combination thereof. The randomization module 150 may include an output adjustment module 152 to compensate for the randomization operations and to ensure that the correct target vector is determined. In some implementations, the randomization module 150 may access the contents of the registers 136-142 functions to retrieve and store data during Fast NTT iterations.

Figure 2:
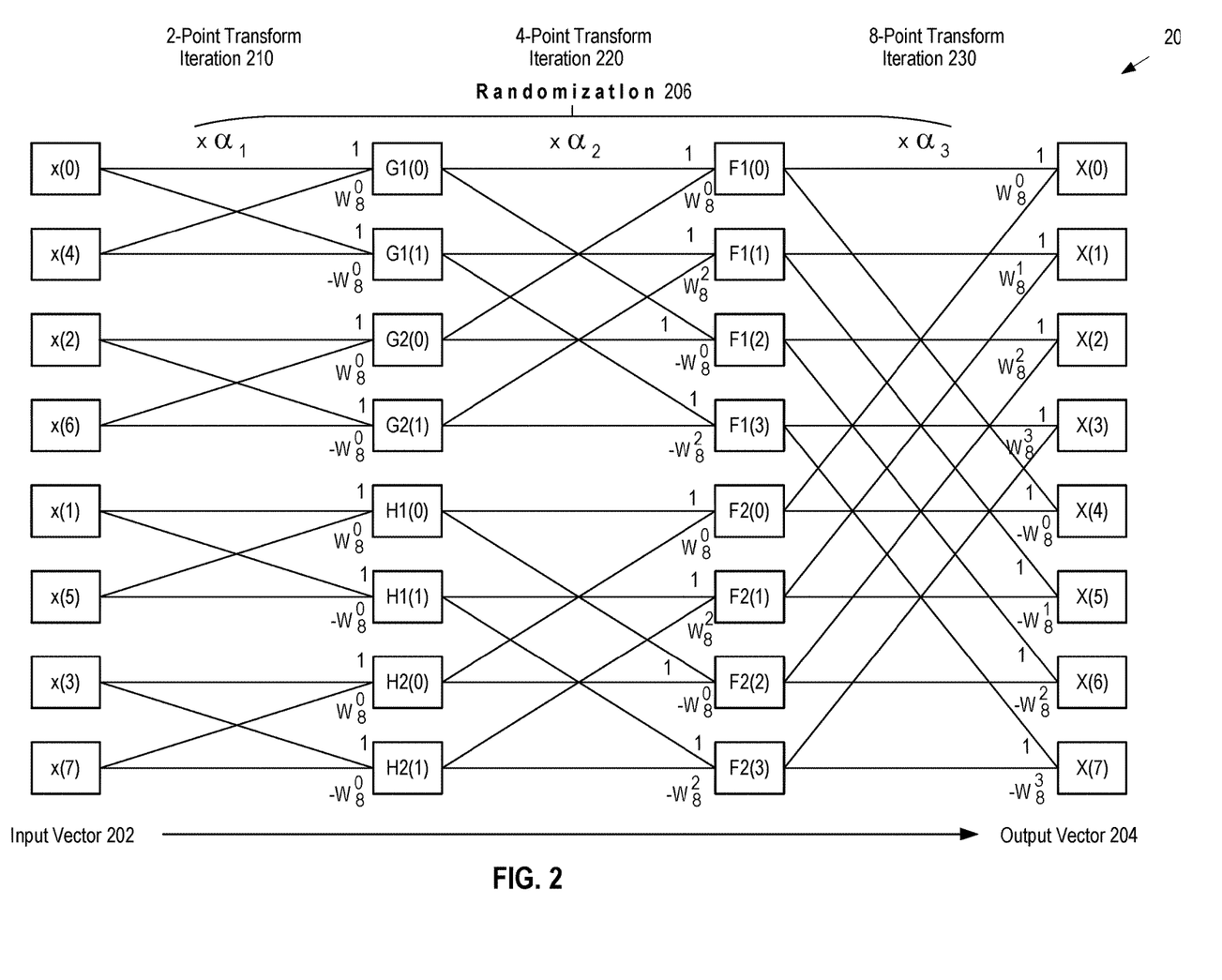
FIG. 2 is an exemplary illustration of a number theoretic transform (or digital Fourier transform) process that uses intermediate randomization to protect secure information from side-channel attacks, in accordance with one or more aspects of the present disclosure.

FIG. 2 is an exemplary illustration of an NTT (or DFT) process 200 that uses intermediate randomization to protect secure information from side-channel attacks, in accordance with one or more aspects of the present disclosure. Shown is the Cooley-Tukey (CT) butterfly implementation (Decimation-in-time FFT) based on grouping even components of the input vector 202 x(0), x(2), . . . x(N−2) and odd components of the input vector 202 x(1), x(3), . . . x(N−1) as separate N/2-point NTTs and continuing similar grouping until N/2 of 2-point NTTs are reached (radix-2 implementation). Accordingly, the NTT is implemented as $\log_2 N$ stages of increased scope until the output vector 204 X(k) is obtained. Shown is an exemplary implementation for N=8, but similar operations may be performed for any N that is an integer power of 2 if $W_8$ is replaced with general $W_N$.

In the depicted N=8 implementation, the 2-point transform iteration 210 involves four CT butterfly operations to compute two intermediate values from each pair of input values grouped as x(m), x(m+N/2). The lines indicate which input values are used in computing the respective intermediate values and the numbers and letters indicate weights (twiddle factors) associated with each line. For example, the first CT butterfly operation computes $$G1(0)=x(0)+W_8^0 \cdot x(4), G1(1)=x(0)-W_8^0 \cdot x(4).$$

Similar operations are performed for other iterations. For example, F1(1) and F1(3) intermediate values of the 4-point transform iteration 220 may be computed according to $$F1(1)=G1(1)+W_8^2 \cdot G2(1), F1(3)=G1(1)-W_8^2 \cdot G2(1),$$

and X(3) and X(7) output values of the 8-point transform (last) iteration 230 may be computed according to $$X(3)=F1(3)+W_8^3 \cdot F2(3), X(7)=F1(3)-W_8^3 \cdot F2(3).$$

To protect the NTT process 200 from side-channel attacks, some or all the intermediate stages (iterations) may include randomization operations 206. In some implementations, the randomization operations may include multiplying roots of unity by random numbers. In some implementations, all operations of the same iteration may be randomized using the same random number but the random numbers of different iterations may be different from each other. For example, all $\pm W_8^0$ of the 2-point transform iteration 210 may be multiplied by a first random number $\alpha_1$, all $\pm W_8^0$ and $\pm W_8^2$ of the 4-point transform iteration 220 may be multiplied by a second random number $\alpha_2$, and all $\pm W_8^0$, $\pm W_8^1$, $\pm W_8^2$ and $\pm W_8^3$ of the 8-point transform iteration 230 may be multiplied by a third random number $\alpha_3$. Accordingly, the exemplary operations listed above, with randomization, may be performed as $$G1(0)=x(0)+\alpha_1 \cdot W_8^0 \cdot x(4), G1(1)=x(0)-\alpha_1 \cdot W_8^0 \cdot x(4), F1(1)=G1(1)+\alpha_2 \cdot W_8^2 \cdot G2(1), F1(3)=G1(1)-\alpha_2 \cdot W_8^2 \cdot G2(1), X(3)=F1(3)+\alpha_3 \cdot W_8^3 \cdot F2(3), X(7)=F1(3)-\alpha_3 \cdot W_8^3 \cdot F2(3).$$

The presence of the random numbers $\alpha_j$ modifies the output values X(m) and makes them different from the correct (target) output values (the output values that would have been obtained if the randomization operations had not been performed). For example, the output component X(5) of the NTT process 200 may be $$X(5)=x(0)-\alpha_3 \cdot W_8^1 \cdot x(1)+\alpha_2 \cdot W_8^2 \cdot x(2)-\alpha_2 \cdot \alpha_3 \cdot W_8^3 \cdot x(3)- \\ \alpha_1 \cdot W_8^0 \cdot x(4)+1 \cdot \alpha_3 \cdot W_8^1 \cdot x(5)-\alpha_1 \cdot \alpha_2 \cdot W_8^2 \cdot x(6)+ \\ \alpha_1 \cdot \alpha_2 \cdot \alpha_3 \cdot W_8^3 \cdot x(7)$$

To compensate for the appearance of the randomization factors in the last expression, the input vector 202 components x(m) may be adjusted (e.g., prior to the first iteration 210) according to the following schedule. The first input pair x(0), x(4) may be adjusted as x(0)→x(0),x(4)→x(4)÷$\alpha_1$. The second pair x(2), x(6) may be adjusted by dividing by $\alpha_2$, and so on, as follows (divisors shown):

$$\begin{pmatrix} x(0) \\ x(4) \end{pmatrix} \to \begin{pmatrix} x(0) \\ x(4) \end{pmatrix} \div \begin{pmatrix} 1 \\ \alpha_1 \end{pmatrix} \quad \begin{pmatrix} x(1) \\ x(5) \end{pmatrix} \to \begin{pmatrix} x(1) \\ x(5) \end{pmatrix} \div \begin{pmatrix} 1 \\ \alpha_1 \end{pmatrix} \div \alpha_3$$

$$\begin{pmatrix} x(2) \\ x(6) \end{pmatrix} \to \begin{pmatrix} x(2) \\ x(6) \end{pmatrix} \div \begin{pmatrix} 1 \\ \alpha_1 \end{pmatrix} \div \alpha_2 \quad \begin{pmatrix} x(3) \\ x(7) \end{pmatrix} \to \begin{pmatrix} x(3) \\ x(7) \end{pmatrix} \div \begin{pmatrix} 1 \\ \alpha_1 \end{pmatrix} \div \alpha_2 \div \alpha_3.$$

The adjustment of the odd pairs differs from the adjustment of the even pairs by the extra divisor equal to the random value of the last iteration (e.g., $\alpha_3$, in case of N=8).

In another implementation, the randomization may be performed by replacing the Nth root of unity with another root of unity of the same order $W_N \to \tilde{W}_N$. For example, replacing the root $W_8 \to \tilde{W}_8 = W_8^3$ leads to the following remapping of the roots:

$$W_8^1 \leftrightarrow W_8^3, W_8^2 \leftrightarrow W_8^6, W_8^5 \leftrightarrow W_8^7,$$

whereas $W_8^0$ and $W_8^4$, being fixed by symmetry, remain unchanged. Any such random remapping that maps each root to one other root can be used. Specifically, there may be N/2 acceptable remapping schemes (remapping schemes $W_N \to \tilde{W}_N = W_N^{2j}$ are not acceptable because they map both even and odd-ordered roots onto even-ordered roots). One of the remapping schemes may be selected for the entire NTT process and maintained for all iterations of the process. After the completion of the NTT process, the correct components of the output vector 204 may be retrieved with a reverse remapping. In the above example, the final readout may be performed as follows $$X(1) \leftrightarrow X(3), X(2) \leftrightarrow X(6), X(5) \leftrightarrow X(7),$$

whereas X(0) and X(4) are read out directly from the corresponding outputs. In some implementations, for additional protection, the two randomization approaches may be combined: a global remapping scheme may be randomly selected for the entire NTT process and $\log_2 N$ random numbers $\alpha_j$ may additionally be selected for multiplication randomization within each of the $\log_2 N$ iterations. In some implementations, the selected roots of unity can be randomly selected from the roots of unity of order 2N order $W_N \to \tilde{W}_{2N}$ such that $\tilde{W}_{2N}^2 = -1$.

Figure 3:
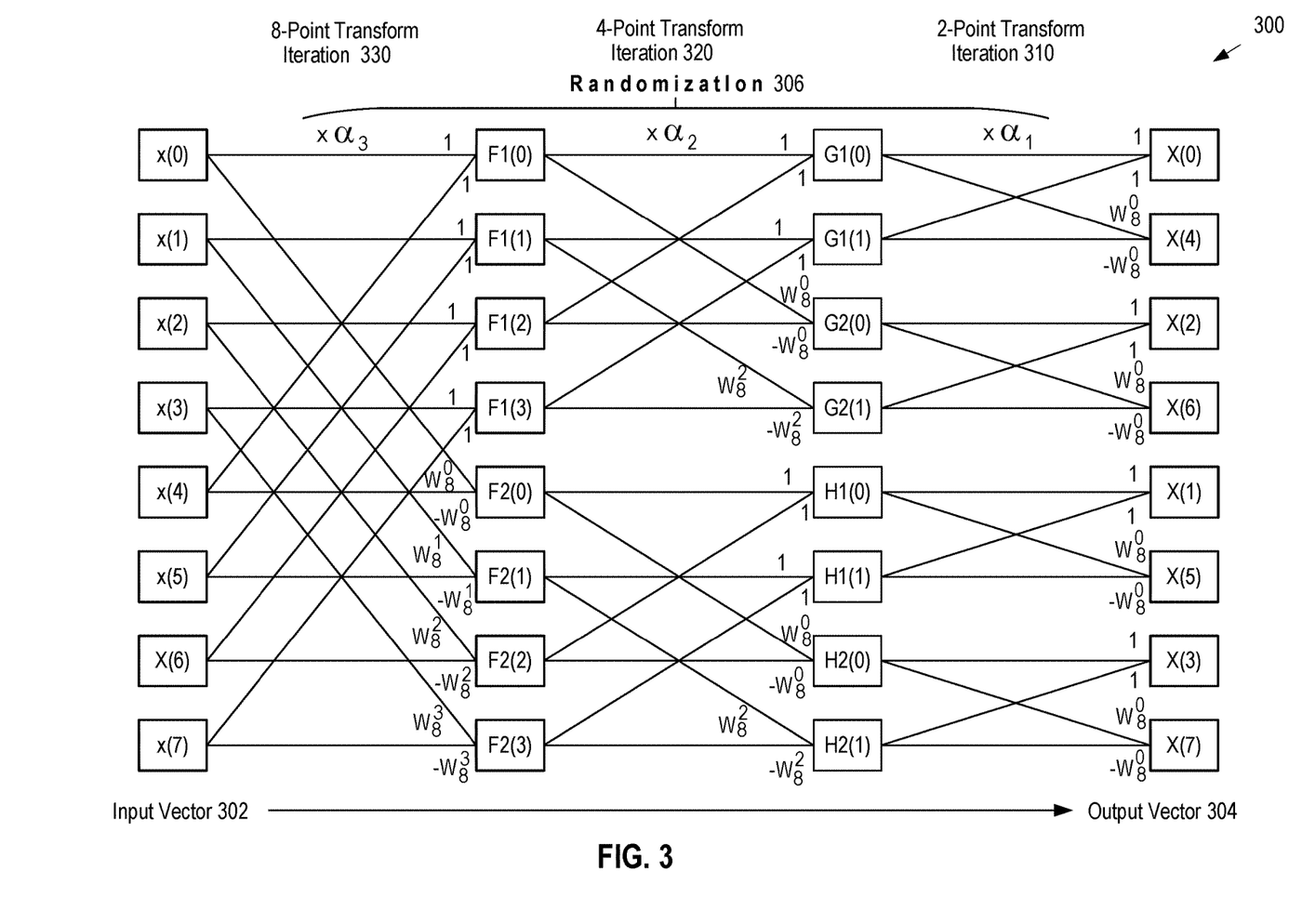
FIG. 3 is another exemplary illustration of a number theoretic transform (or digital Fourier transform) process that uses intermediate randomization to protect secure information from side-channel attacks, in accordance with one or more aspects of the present disclosure.

FIG. 3 is another exemplary illustration of an NTT (or DFT) process 300 that uses intermediate randomization to protect secure information from side-channel attacks, in accordance with one or more aspects of the present disclosure. Shown is the Gentleman-Sande (GS) butterfly implementation (Decimation-in-frequency FFT) based on grouping the first half of the components of the input vector 202 x(0), x(1), . . . x(N/2−1) and the second half of the components of the input vector 202 x(N/2−1), x(N/2−2), . . . x(N−1) as separate N/2-point NTTs for and continuing such grouping until N/2 of 2-point NTTs are reached (radix-2 implementation). Accordingly, the NTT is implemented as $\log_2 N$ stages of increased scope until the output vector 304 X(k) is obtained. Shown is exemplary implementation of N=8, but similar operations may be performed for any N that is an integer power of 2 with $W_8$ being replaced with more general $W_N$.

In the depicted N=8 implementation, the 2-point transform iteration 310 (which is performed last) involves four GS butterfly operations to compute the components of the output vector 304 X(k), grouped as X(m), X(m+N/2), from a respective pair of intermediate values (G and H). The lines indicate which input values are used in computing the respective intermediate values and the numbers and letters indicate weights (twiddle factors) associated with each line. For example, the third GS butterfly operation of the 2-point transform iteration 310 includes computing $$X(1)=H1(0)+H1(1), X(5)=W \cdot (H1(0)-H1(1)).$$

Similar operations are performed for other iterations. For example, G1(1) and G2(1) intermediate values of the 4-point transform iteration 320 may be computed according to $$G1(1)=F1(1)+F1(3), G2(1)=W_8^2 \cdot (F1(1)-F1(3)),$$

and F1(3) and F2(3) intermediate values of the 8-point transform iteration 330 (which is performed first) may be computed from the components x(3), x(7) of the input vector 302 according to $$F1(3)=x(3)+x(7), F2(3)=W_8^3 \cdot (x(3)-x(7)).$$

To protect the NTT process 200 from side-channel attacks, some or all the intermediate stages may include randomization operations 306. In some implementations, the randomization operations may include multiplying roots of unity by random numbers. In some implementations, all operations of the same iteration may be randomized using the same random number but the random numbers of different iterations may be different from each other. For example, all $\pm W_8^0$ of the 2-point transform iteration 310 may be multiplied by a first random number $\alpha_1$, all $\pm W_8^0$ and $\pm W_8^2$ of the 4-point transform iteration 320 may be multiplied by a second random number $\alpha_2$, and all $\pm W_8^0$, $\pm W_8^1$, $\pm W_8^2$ and $\pm W_8^3$ of the 8-point transform iteration 310 may be multiplied by a third random number 3. Accordingly, the exemplary operations listed above, with randomization, may be performed as $$X(1)=H1(0)+H1(1), X(5)=\alpha_1 \cdot W_8^0 \cdot (H1(0)-H1(1)), G1 \\ (1)=F1(1)+F1(3), G2(1)=\alpha_2 \cdot W_8^2 \cdot (F1(1)-F1(3)), \\ F1(3)=x(3)+x(7), F2(3)=\alpha_3 \cdot W_8^3 \cdot (x(3)-x(7)).$$

The presence of the random numbers $\alpha_j$ modifies the output values X(m) and makes them different from the (target) correct output values (as would have been determined absent the randomization operations). For example, the output component X(6) of the NTT process 300 may be $$X(5)=\alpha_1 \cdot \alpha_3 \cdot W_8^0 \cdot (x(0)-x(4))+\alpha_1 \cdot \alpha_3 \cdot W_8^2 \cdot (x(2)-x(6))- \\ \alpha_1 \cdot \alpha_3 \cdot W_8^1 \cdot (x(1)-x(5))-\alpha_1 \cdot \alpha_3 \cdot W_8^3 \cdot (x(3)-x(7))$$

To compensate for the appearance of the randomization factors in the last expression, the output vector 304 components X(k) may be adjusted (e.g., after the 2-point transform iteration 310) according to the following schedule. The first output pair X(0), X(4) may be adjusted as X(0)→X(0), X(4)→X(4)=$\alpha_1$. The second pair X(2), X(6) may be adjusted by dividing by $\alpha_2$, and so on, as follows (divisors shown):

$$\begin{pmatrix} X(0) \\ X(4) \end{pmatrix} \to \begin{pmatrix} X(0) \\ X(4) \end{pmatrix} \div \begin{pmatrix} 1 \\ \alpha_1 \end{pmatrix} \quad \begin{pmatrix} X(1) \\ X(5) \end{pmatrix} \to \begin{pmatrix} X(1) \\ X(5) \end{pmatrix} \div \begin{pmatrix} 1 \\ \alpha_1 \end{pmatrix} \div \alpha_3$$

-continued $$\begin{pmatrix} X(2) \\ X(6) \end{pmatrix} \to \begin{pmatrix} X(2) \\ X(6) \end{pmatrix} \div \begin{pmatrix} 1 \\ \alpha_1 \end{pmatrix} \div \alpha_2 \qquad \begin{pmatrix} X(3) \\ X(7) \end{pmatrix} \to$$

$$\begin{pmatrix} X(3) \\ X(7) \end{pmatrix} \div \begin{pmatrix} 1 \\ \alpha_1 \end{pmatrix} \div \alpha_2 \div \alpha_3.$$

The adjustment of the odd pairs differs from the adjustment of the even pairs by the extra divisor equal to the random value of the 2-point transform iteration (e.g., $\alpha_3$, in case of N=8).

In another implementation, the randomization may be performed by replacing the Nth root of unity with another root of unity of the same order $W_N \to \tilde{W}_N$ and subsequent remapping of the outputs in the same way as described in relation to FIG. 2 and the CT butterfly iterations. In some implementations, for additional protection, the two randomization approaches (e.g., the randomization of the GS butterflies and root remapping) may be combined: a global remapping scheme may be randomly selected for the NTT process and $\log_2 N$ random numbers $\alpha_j$ may additionally be selected for multiplication randomization within each of the $\log_2 N$ iterations.

FIGS. 2 and 3 depict radix-2 implementations, where output values of each iteration are determined as linear combinations of 2 input values. In some implementations, radix-4(radix-6, radix 8, etc.) may similarly be randomized. For example, in a radix-4 implementation, the output values of each iteration are determined as linear combinations of 4 input values. Similarly, more general radix-R transformations may be randomized. In some implementations, different radix values may be used in different iterations. For example, the first iteration may be a radix-4 iteration whereas subsequent iteration may be radix-2 iterations.

Figure 4:
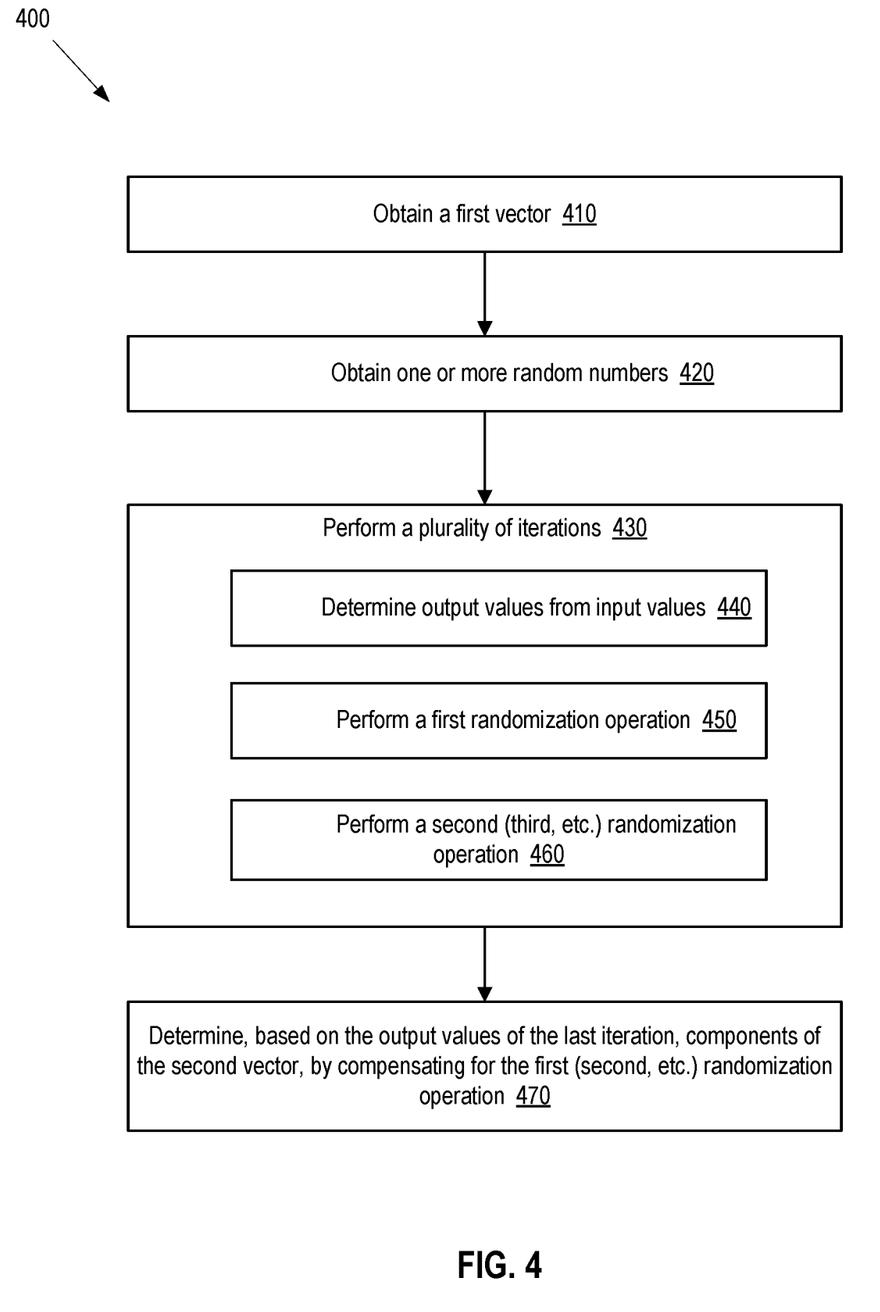
FIG. 4 depicts a flow diagram of an illustrative example of a method of protecting secure information during a number theoretic transform (or digital Fourier transform) computation from side-channel attacks by intermediate randomization, in accordance with one or more aspects of the present disclosure.

FIG. 4 depicts a flow diagram of an illustrative example of method 400 of protecting secure information during NTT (or FFT) computations from side-channel attacks by intermediate randomization, in accordance with one or more aspects of the present disclosure. Method 400 and/or each of its individual functions, routines, subroutines, or operations may be performed by one or more processing units of the computer system implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Various blocks of the method 400 may be performed in a different order compared to the order shown in FIG. 4. Some blocks may be performed concurrently with other blocks. Some blocks may be optional.

Method 400 may be implemented by the processor/ALU (e.g., the processor 120 of FIG. 1) performing a cryptographic operation, which may involve a public key number and a private key number, two private key numbers, a digital signature, and so on. The cryptographic operation may be a part of a larger computational operation involving multiple private key numbers and/or multiple public key numbers. The cryptographic operation may involve post-quantum key encapsulation algorithms (e.g., Kyber, NewHope) and/or post-quantum digital signatures (e.g., Dilithium). The cryptographic operation may include a transformation of a first vector (e.g., input vector 202 or 302) to a second vector. The transformation of the first vector to the second vector may express the components of the second vector as a polynomial in a number that is a root of unity (modulo some number, in case of NTT, or in the complex plane, in case of DFT). The coefficients of the polynomial may be determined by the components of the first vector. In some implementations, the transformation is an NTT transformation of a first vector having N components x(m) into a second vector having N components X(k). In some implementations, the transformation is a DFT transformation. The transformation may be a direct transformation (NTT or DFT) or an inverse transformation (NTT or DFT).

At block 410, a processing device performing method 400 (e.g., the processor 120 of FIG. 1) may obtain components of the first vector. For example the processing device may obtain identifications (e.g., addresses) of the input registers 136 where the components of the first vector are stored. At block 420, method 400 may continue with obtaining one or more random numbers. In some implementations, the one or more random numbers may be generated by a random number generator of the randomization module 152. In some implementations, the random numbers may be stored in the input registers 136 or the working registers 140 prior to obtaining the first vector. In some implementations, random numbers are generated one by one, as the need arises, e.g., prior to performing a respective iteration of the NTT (or DFT) where a random number is to be used.

At block 430 method 400 may continue with performing a plurality of iterations to process the components of the first vector. As part of block 440, a first iteration may use the components of the first vector as input values and produce output values that are linear combinations of the input values, e.g., where each of the output values is a combination of two input values (radix-2 computations), 4 input values (radix-4 computations), or some other combination of any other number of input values. A second iteration may use the output values of the first iteration as input values and may perform similar computations. Such iterative process may continue until all iterations are performed with the output values of a previous iteration serving as the input values into the subsequent iteration. The output values of the last iteration may be representative of the components of the second vector. In some implementations, the output values of the last iteration may still be different from the components of the second vector and may undergo additional adjustment to be made equal to the components of the second vector.

In some implementations, all iterations may be the same-radix iterations, e.g., all iterations may be radix-2 (or radix-4, etc.) iterations. In such implementations, the number of iterations may be $\log_2 N$ (or $\log_4 N$, etc.). In some implementations, some of the iterations may be radix-m iterations whereas other operations may be radix-n operations with m≠n. In some implementations, each iteration of the plurality of iterations may include Cooley-Tukey butterfly transformations (see FIG. 2) or Gentleman-Sande butterfly transformations (see FIG. 3). In some implementations, each of the plurality of iterations may include addition and multiplication operations modulo a prime number (e.g., in instances of NTT). In some implementations, each of the plurality of iterations may include operations involving complex numbers (e.g., in instances of DFT).

As part of block 450, the processing device performing method 400 may perform a first randomization operation in conjunction with one of the iterations ("the first randomized iteration"). The randomization operation may be performed by the randomization module 150 of the computer system 102. In some implementations, the first randomized iteration may be the same as the first iteration. In some implementations, the first randomized iteration may be the r-th iteration (with the first r−1 iterations not being randomized). The first randomization operation may include multiplying at least one input value into the first randomized iteration by a first random number ($\alpha_1$) of the one or more random numbers ($\alpha_1, \alpha_2 \ldots \alpha_N$). For example, in instances of CT butterfly iterations, two input values into the first randomization operation A and B may be transformed into the output values of the first randomization operation according to: A, B→A+B·$\alpha_1$·$W_N$, A−B·$\alpha_1$·$W_N$. Likewise, in instances of GS butterfly iterations, two input values into the first randomization operation A and B may be transformed into the output values of the first randomization operation according to: A, B→A+B, (A−B)·$\alpha_1$·$W_N$. In both the CT butterfly implementations and GS butterfly implementations, the first randomization operation includes multiplying the at least one input value (A or B or both A and B) by a first root of unity $W_N$ In some implementations, the first random number used in the first randomized iteration is a randomly-selected root of unity (e.g., roots of unity of order N or of order 2N). For example, in instances of CT butterfly iterations, two input values into the first randomization operation A and B may be transformed according to: A, B→A+B·$\tilde{W}_N$, A−B·$\tilde{W}_N$ whereas in instances of GS butterfly iterations, the input values may be transformed according to: A, B→A+B, (A−B)·$\tilde{W}_N$. The random root of unity $\tilde{W}_N$ may be selected from a plurality of roots of unity which may be a subset of all roots of unity of order N (e.g., the subset of odd-numbered roots of unity, $W_N$, $W_N^3$, $W_N^5$, . . . ) or a subset of roots of unity of order 2N.

As part of block 460, the processing device performing method 400 may perform a second randomization operation in conjunction with one of the iterations ("the second randomized iteration"). One or more of the output values of the second randomized iteration are randomized by multiplying at least one input value into the second randomized iteration by a second random number ($\alpha_2$) of the one or more random numbers ($\alpha_1, \alpha_2 \ldots \alpha_N$) and by a second root of unity (e.g., $W_N^2$, $W_N^3$, . . . ), which may be different from the first root of unity (but may also be the same as the first root, e.g., $W_N$), used in the first randomized iteration. In some implementations, the second randomized iteration may immediately follow the first randomized iteration. In some implementations, however, the second randomized iteration may be a later iteration (such that there are s non-randomized iterations between the first randomized iteration and the second randomized iterations). In some implementations, all subsequent iterations (e.g., third, fourth, etc.) are randomized using a respective random number of the plurality of random numbers ($\alpha_3, \alpha_4 \ldots \alpha_N$). In some implementations, only some of the iterations are randomized. In some implementations, only the first iteration is randomized. For example, during (or prior to) the first randomized iteration, the random root of unity $\tilde{W}_N$ is selected to be used in the first randomized iteration and the same (once-selected) root of unity $\tilde{W}_N$ is then used throughout all subsequent iterations (which do not undergo any additional randomizations). In some implementations, the random root of unity $\tilde{W}_N$ is selected during (or prior to) the first randomized iteration, and one or more random numbers ($\alpha_1, \alpha_2 \ldots \alpha_N$) are still used in some (or all) iterations (including the first randomized iteration already randomized by the random selection of $\tilde{W}_N$) for added security and protection of data.

At block 460, the processing device performing method 400 may determine, based on the output values of the last iteration, the components of the second vector. Because of the randomization performed at blocks 450 and 460, the output values of the last iteration may not be the same as the (target) components of the second vector. Accordingly, the processing device may perform a plurality of adjustment operations to compensate for the first (second, third, etc.) randomization operation. The adjustment operations may be performed by the output adjustment module 152 of the randomization module 150 of the computer system 102. For example, the adjustment operations may involve a division operation (which in modulo p arithmetic may be performed via a multiplication operation using an appropriately determined multiplier, e.g. using the Montgomery multiplication). The division operation may depend on the specific output value being adjusted and may involve (in cases of GS implementations) dividing the output values of the last iteration by one or more random numbers ($\alpha_1, \alpha_2 \ldots \alpha_N$), as described in more detail in relation to FIG. 3. Such division transforms the output values of the last iteration into the actual components of the second vector.

In some implementations, in instances where a random root of unity $\tilde{W}_N$ was selected, the plurality of adjustment operations may include remapping (reshuffling) outputs of the last iteration to obtain the correct sequence of the components of the second vector. In some implementations, two sets of adjustment operations may be performed. For example, if prior to the first randomized iteration a random root of unity $\tilde{W}_N$ was selected, followed by randomization multiplications using random numbers $\alpha_1, \alpha_2 \ldots \alpha_N$, the adjustment operations may be performed in the reverse order. First, the adjustment divisions by one or more random numbers $\alpha_1, \alpha_2 \ldots \alpha_N$ is performed followed by remapping (reshuffling) of the resulting output values to obtain the components of the second vector.

In some implementations (e.g., in cases of CT iterations), the adjustment operations may adjust values of a respective component of the first (i.e. input) vector rather than the output values of the last iteration. For example, the adjustment operations may involve dividing the components of the input vector by one or more random numbers ($\alpha_1, \alpha_2 \ldots \alpha_N$), as described in more detail in relation to FIG. 2. In such instances, the adjustment operations are performed prior to performing the first iteration and the output values of the last iterations are the actual components of the second vector. In some implementations, in the instances where a random root of unity $\tilde{W}_N$ was selected, the plurality of adjustment operations may include remapping (reshuffling) outputs of the last iteration to obtain the correct sequence of the components of the second vector. In such implementations, the division of the components of the first vector by one or more random numbers $\alpha_1, \alpha_2 \ldots \alpha_N$, is performed prior to the first iteration whereas the remapping (reshuffling) of the output values to obtain the components of the second vector is performed after the last iteration.

Figure 5:
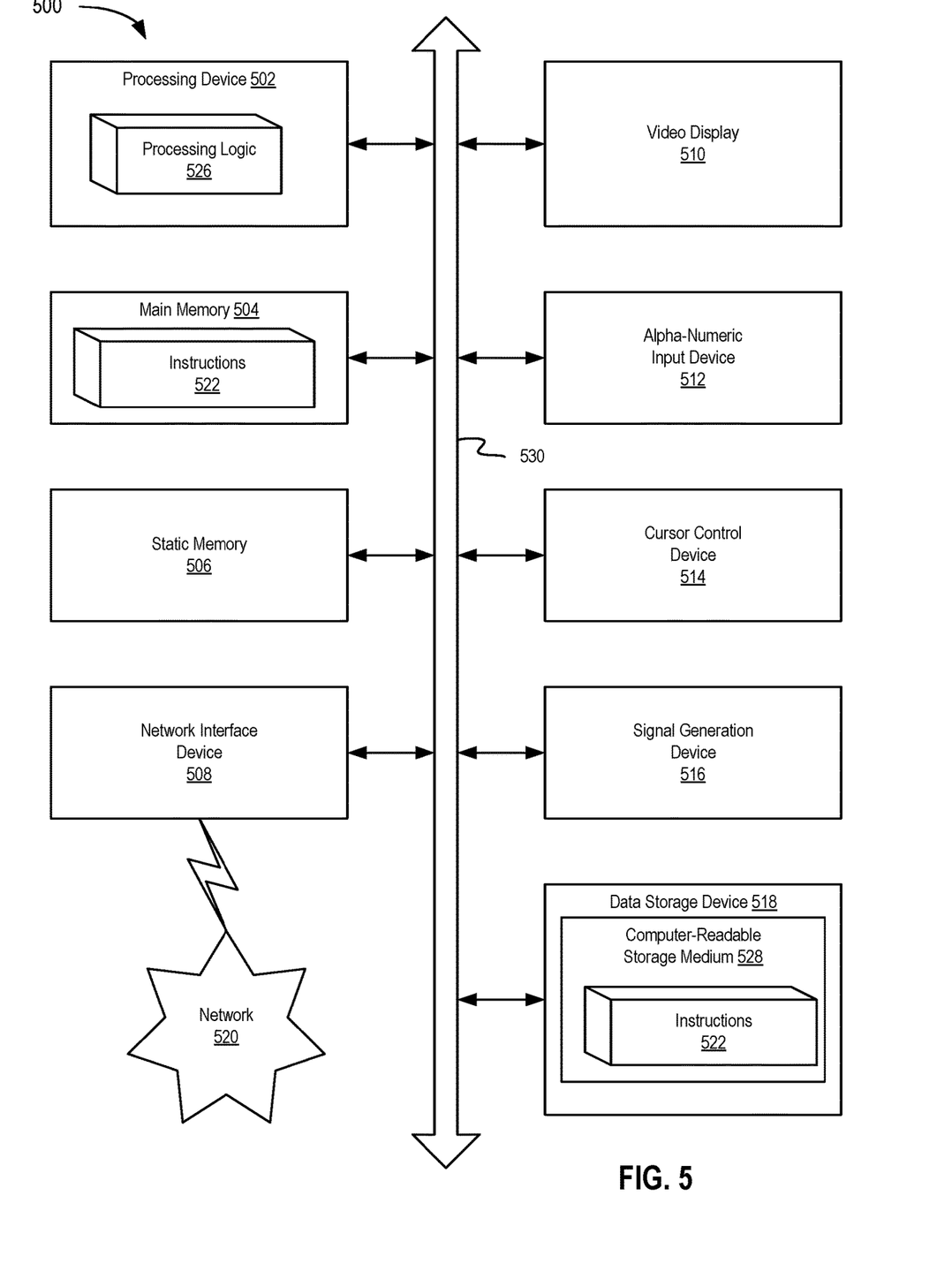
FIG. 5 depicts a block diagram of an example computer system operating in accordance with one or more aspects of the present disclosure.

FIG. 5 depicts a block diagram of an example computer system 500 operating in accordance with one or more aspects of the present disclosure. In various illustrative examples, computer system 500 may represent the computer system 102, illustrated in FIG. 1.

Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of protecting secure information during NTT (or FFT) computations from side-channel attacks by intermediate randomization.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of protecting secure information during NTT (or FFT) computations from side-channel attacks by intermediate randomization.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to perform a cryptographic operation that comprises a number theoretic transformation (NTT) of a first vector to a second vector, the method comprising:
   obtaining, by a processing device, components of the first vector;
   obtaining, by the processing device, one or more random numbers;
   performing, by the processing device, a plurality of iterations, wherein each of the plurality of iterations comprises:
   determining a plurality of output values, wherein each of the plurality of output values is a linear combination of two or more input values;
   wherein (1) the input values into a first iteration of the plurality of iterations are the components of the first vector, (2) the input values into each subsequent iteration of the plurality of iterations are the output values of a previous iteration of the plurality of iterations, (3) the output values of the last of the plurality of iterations are representative of components of the second vector, and wherein one or more of the output values of a first randomized iteration of the plurality of iterations are randomized using a first randomization operation that comprises multiplying at least one input value into the first randomized iteration by a first random number of the one or more random numbers; and
   determining, by the processing device, based on the output values of the last of the plurality of iterations, the components of the second vector.

2. The method of claim 1, further comprising:
   performing a plurality of adjustment operations, wherein each of the plurality of adjustment operations is to adjust a respective output value of the last of the plurality of iterations to compensate for the first randomization operation and to make the output values of the last of the plurality of iterations equal to the components of the second vector.

3. The method of claim 1, further comprising:
   performing a plurality of adjustment operations, wherein each of the plurality of adjustment operations is to adjust a value of a respective component of the first vector to compensate for the first randomization operation and to make the output values of the last of the plurality of iterations equal to the components of the second vector.

4. The method of claim 1, wherein a number of iterations of the plurality of iterations is equal to a logarithm of a number of components of the first vector to base two, and wherein the number of components of the first vector is equal to a number of components of the second vector.

5. The method of claim 1, wherein each of the plurality of iterations comprises a plurality of parallel instances of Cooley-Tukey butterfly transformations or a plurality of parallel instances of Gentleman-Sande butterfly transformations.

6. The method of claim 1, wherein the first randomization operation further comprises multiplying the at least one input value into the first randomized iteration by a first root of unity.

7. The method of claim 6, wherein one or more of the output values of a second randomized iteration of the plurality of iterations are randomized using a second randomization operation that comprises multiplying at least one input value into the second randomized iteration by a second random number of the one or more random numbers and by a second number that is a second root of unity.

8. The method of claim 1, wherein the first random number is a first root of unity, randomly selected from a plurality of roots of unity of order N or from a plurality of roots of unity of order 2N, wherein N is a number of the components of the first vector.

9. The method of claim 1, wherein each of the output values of each of the plurality of iterations is determined based on two output values of the previous iteration.

10. A non-transitory computer-readable medium storing instruction thereon, wherein the instructions, when executed by a processing device performing a cryptographic operation that comprises a number theoretic transformation (NTT) of a first vector to a second vector, cause the processing device to:
    obtain components of the first vector;
    obtain one or more random numbers;
    perform a plurality of iterations, wherein in each of the plurality of iterations the processing device is to:
    determine a plurality of output values, wherein each of the plurality of output values is a linear combination of two or more input values;
    wherein (1) the input values into a first iteration of the plurality of iterations are the components of the first vector, (2) the input values into each subsequent iteration of the plurality of iterations are the output values of a previous iteration of the plurality of iterations, (3) the output values of the last of the plurality of iterations are representative of components of the second vector, and wherein one or more of the output values of a first randomized iteration of the plurality of iterations are randomized using a first randomization operation that comprises multiplying at least one input value into the first randomized iteration by a first random number of the one or more random numbers; and
    determine, based on the output values of the last of the plurality of iterations, the components of the second vector.

11. The computer-readable medium of claim 10, wherein the instructions are further to cause the processing device to:
    perform a plurality of adjustment operations, wherein each of the plurality of adjustment operations is to adjust a respective output value of the last of the plurality of iterations to compensate for the first randomization operation and to make the output values of the last of the plurality of iterations equal to the components of the second vector.

12. The computer-readable medium of claim 10, wherein the instructions are further to cause the processing device to:
    perform a plurality of adjustment operations, wherein each of the plurality of adjustment operations is to adjust a value of a respective component of the first vector to compensate for the first randomization operation and to make the output values of the last of the plurality of iterations equal to the components of the second vector.

13. The computer-readable medium of claim 10, wherein a number of iterations of the plurality of iterations is equal to a logarithm of a number of components of the first vector to base two, and wherein the number of components of the first vector is equal to a number of components of the second vector.

14. The computer-readable medium of claim 10, wherein each of the plurality of iterations comprises a plurality of parallel instances of Cooley-Tukey butterfly transformations or a plurality of parallel instances of Gentleman-Sande butterfly transformations.

15. The computer-readable medium of claim 10, wherein the first randomization operation further comprises multiplying the at least one input value into the first randomized iteration by a first root of unity.

16. The computer-readable medium of claim 15, wherein one or more of the output values of a second randomized iteration of the plurality of iterations are randomized using a second randomization operation that comprises multiplying at least one input value into the second randomized iteration by a second random number of the one or more random numbers and by a second number that is a second root of unity.

17. The computer-readable medium of claim 10, wherein the first random number is a first root of unity, randomly selected from a plurality of roots of unity of order N or from a plurality of roots of unity of order 2N, wherein N is a number of the components of the first vector.

18. The computer-readable medium of claim 10, wherein each of the output values of each of the plurality of iterations is determined based on two output values of the previous iteration.

19. A system to perform a cryptographic operation that comprises a number theoretic transformation (NTT) of a first vector to a second vector, the system comprising:

a memory device to store a first vector and a second vector; and a processing device coupled to the memory device, the processing device to:

obtain components of the first vector;

obtain one or more random numbers;

perform a plurality of iterations, wherein in each of the plurality of iterations the processing device is to:

determine a plurality of output values, wherein each of the plurality of output values is a linear combination of two or more input values;

wherein (1) the input values into a first iteration of the plurality of iterations are the components of the first vector, (2) the input values into each subsequent iteration of the plurality of iterations are the output values of a previous iteration of the plurality of iterations, (3) the output values of the last of the plurality of iterations are representative of components of the second vector, and wherein one or more of the output values of a first randomized iteration of the plurality of iterations are randomized using a first randomization operation that comprises multiplying at least one input value into the first randomized iteration by a first random number of the one or more random numbers; and determine, based on the output values of the last of the plurality of iterations, the components of the second vector.

20. The system of claim 19, wherein the processing device is further to:

perform a plurality of adjustment operations, wherein each of the plurality of adjustment operations is to adjust a respective output value of the last of the plurality of iterations to compensate for the first randomization operation and to make the output values of the last of the plurality of iterations equal to the components of the second vector.

* * * * *